(12) United States Patent
Chow et al.

(10) Patent No.: US 11,649,342 B2
(45) Date of Patent: May 16, 2023

(54) MONOLAYER FILM HAVING RECYCLE EVOH

(71) Applicant: KURARAY CO., LTD., Kurashiki (JP)

(72) Inventors: Edgard Chow, Houston, TX (US); Diana Maya, Houston, TX (US); Wataru Hirose, Houston, TX (US)

(73) Assignee: KURARAY CO., LTD., Kurashiki (JP)

( * ) Notice: Subject to any disclaimer, the term of this patent is extended or adjusted under 35 U.S.C. 154(b) by 163 days.

(21) Appl. No.: 16/568,977

(22) Filed: Sep. 12, 2019

(65) Prior Publication Data

US 2020/0087493 A1 Mar. 19, 2020

Related U.S. Application Data

(60) Provisional application No. 62/731,425, filed on Sep. 14, 2018.

(51) Int. Cl.
| | | |
|---|---|---|
| *C08L 23/08* | (2006.01) | |
| *C08L 23/26* | (2006.01) | |
| *C08J 5/18* | (2006.01) | |

(52) U.S. Cl.
CPC ............. *C08L 23/08* (2013.01); *C08J 5/18* (2013.01); *C08L 23/26* (2013.01); *C08L 2203/16* (2013.01); *C08L 2205/025* (2013.01); *C08L 2205/03* (2013.01); *C08L 2205/08* (2013.01); *C08L 2207/20* (2013.01)

(58) Field of Classification Search
CPC ....... C08L 23/0846–0861; C08L 23/26; C08L 51/06; C08L 2205/025–035; C08L 2205/08; C08L 2207/20
See application file for complete search history.

(56) References Cited

U.S. PATENT DOCUMENTS

| | | | | |
|---|---|---|---|---|
| 5,492,953 A | * | 2/1996 | Itamura | ........ C08K 3/013 524/239 |
| 5,883,188 A | * | 3/1999 | Hwang | ........ C08L 51/06 525/74 |

FOREIGN PATENT DOCUMENTS

| | | |
|---|---|---|
| JP | 3-215032 A | 9/1991 |
| JP | 2000-53812 A | 2/2000 |

* cited by examiner

*Primary Examiner* — Ana L. Woodward
(74) *Attorney, Agent, or Firm* — Oblon, McClelland, Maier & Neustadt, L.L.P.

(57) ABSTRACT

A monolayer film is provided which contains ethylene vinyl alcohol copolymer (EVOH), contamination from dirt and a compatibilizer, that can be used for producing trash bags and the like, as well as a method to successfully recycle fumigation films containing EVOH and contamination from dirt into such a monolayer film.

6 Claims, No Drawings

MONOLAYER FILM HAVING RECYCLE EVOH

CROSS-REFERENCE TO RELATED APPLICATION

This application claims priority under 35 U.S.C. § 119 from U.S. Provisional Application Ser. No. 62/731,425, filed 14 Sep. 2018, the disclosure of which is incorporated by reference herein for all purposes as if fully set forth.

FIELD OF THE INVENTION

The present invention relates generally to a monolayer film which contains ethylene vinyl alcohol copolymer (EVOH), contamination from dirt and a compatibilizer, that can be used for producing trash bags and the like. Additionally, the present invention relates to a method to successfully recycle fumigation and other agricultural films containing EVOH and contamination from dirt into monolayer films as described below.

BACKGROUND OF THE INVENTION

In recent years, the increasing trend for healthier diets has increased demand for more fruits and vegetables, which increases the need to farm in fields that are infested with soil-borne plant pathogens, insects, weeds and/or parasites, such as nematodes. Soil fumigation is the best method of reducing those pest populations sufficiently to produce high-quality and high-yielding crops. In a soil fumigation process, after fumigant is applied, the soil is then covered by a plastic sheet to reduce the loss of fumigants into the atmosphere, which would result in loss of fumigant efficacy and exposure of fumigant to the general environment.

Conventionally, a polyethylene (PE) resin has been used to produce fumigant barrier films. While PE films are inexpensive and excellent in mechanical strength, such films do not offer sufficient fumigation barrier properties at practical thicknesses.

It has been known that EVOH exhibits excellent gas barrier properties (such as oxygen-barrier properties) and excellent melt processability. The oxygen barrier of EVOH is approximately 8000 times superior to that of PE resin. Thus, it has been found that using a multilayer film having an EVOH-based barrier layer as a fumigation film sharply improves gas retention, blocking permeation to keep fumigants in the soil. Because the improvement is dramatic compared to other films, fumigation films containing an EVOH layer have become popular, resulting in improved crop yields even with a low dose of fumigant and reduced risk of environmental exposure.

On the other hand, in recent years, post-consumer recycling of polymer waste material is getting more attention. For example, post-consumer recycled film can be used as a monolayer film for producing trash bags and the like.

It is desirable to recycle agriculture films such as fumigation films; however, there is a problem of contamination and soiling of the agriculture film resulting from its original use and during post-use collection.

Typically, soil-contaminated polymer waste is treated in a single washing step to remove contaminants. If the contamination (soil and other dirt) is not properly removed, it can affect the quality of the final recycled film. For example, dirt and other similar contaminants can cause recycled films to have poor mechanical strength, high haze and an elevated number of fisheye defects.

In general, PE is considered as an easily recycle material. Multilayer films containing EVOH, however, pose some difficulty in recycling if the EVOH content is high, because EVOH has higher thermal sensitivity than PE and is hard to compatibilize with other polyolefin polymers. Thus, the post-consumer recycling of fumigation films which contain EVOH is considered to be difficult because of existence of EVOH and dirt.

Regarding recycling of EVOH, JPH03215032A describes that the recoverability of EVOH-containing multilayer structure improves by using compatibilizing materials. JP2000053812A also describes that the recoverability of a multilayer structure which contains EVOH and inorganic filler improves by using compatibilizing materials. These publications, however, describe in-process recycling (re-grind), and the recycled materials are used as a multilayer structure. There is no description that the recycled materials can be used for a monolayer film, and particularly after post-consumer recycling as described in the context of the present invention.

SUMMARY OF THE INVENTION

This present invention solves the above problem, and the objective of the present invention is to provide a monolayer film containing recycled EVOH and dirt which shows excellent mechanical strength, clarity and a low number of fisheye defects.

In one embodiment, such monolayer film is produced by the recycling of dirty fumigation and other agricultural films having EVOH layer.

In the context of the present invention, it has been found that specific compatibilizers can help to improve clarity and reduce fisheye defects of a monolayer film having EVOH and dirt. Furthermore, these results showed that combination of EVOH and the compatibilizers in the monolayer film functioned to improve clarity and reduce fisheye defects in comparison with PE films having dirt. These results indicate that recyclability of agriculture films can be improved by using agriculture film having EVOH layer and the addition of the compatibilizer as described in further detail below.

Thus, in accordance with the present invention, there is provided a monolayer film (A) of a composition comprising:
a polyolefin resin (B),
an ethylene vinyl alcohol copolymer resin (C) having an ethylene content of from about 20 mol % to about 60 mol %,
a maleic anhydride-modified polyolefin resin (D),
a compatibilizer (E) and
dirt (F),
wherein the mass ratio of dirt (F) is less than about 8 parts by weight based on the total weight of the monolayer film (A).

In another embodiment, the compatibilizer (E) comprises:
a polyolefin resin (G),
a saponified ethylene-vinyl acetate resin (H) having an ethylene content from about 68 mol % to about 98 mol %,
a hydrotalcite (I) and
a metal salt (J).

In another embodiment, the compatibilizer (E) comprises:
a polyolefin resin (G),
a maleic anhydride-modified ethylene-vinyl acetate resin (K) having an ethylene content of from about 68 mol % to about 98 mol %,
a metal salt (J) and
a lubricant (L).

In another embodiment, the average particle size of the dirt in the composition is more than about 20 μm.

In another embodiment, the film is prepared by using previously used (recycled) agriculture film.

In another embodiment, there is provided a process of preparing a monolayer film (A) from used agricultural film comprising a polyolefin resin (B), an EVOH resin (C), an Mah-modified polyolefin resin (D) and dirt (F), the process comprising the steps of:

(1) size-reducing the used agricultural film to generate a size-reduced used agricultural film, (2) cleaning the size-reduced agricultural film to reduce the dirt (F) content and generate a cleaned, size-reduced used agricultural film containing dirt (F), (3) mixing the cleaned, size-reduced used agricultural film with a compatibilizer (E) to generate a mixture, and (4) melt extruding the mixture to generate the monolayer film (A), wherein the monolayer film (A) comprises dirt (F) form the used agricultural film, and the dirt (F) content is reduced in the cleaning step such that a mass ratio of dirt (F) is less than about 8 parts by weight based on the total weight of the monolayer film (A).

In another embodiment, the agriculture film is a fumigation film.

According to the aspects of the present invention, a monolayer film is provided that is superior in mechanical strength, clarity and a low number of fisheye defects. Thus, it can be used as a trash bag and the like.

These and other embodiments, features and advantages of the present invention will be more readily understood by those of ordinary skill in the art from a reading of the following detailed description.

DETAILED DESCRIPTION

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Monolayer Film (A)

The monolayer film (A) of the present invention is formed from a composition comprising a polyolefin (B), an ethylene-vinyl alcohol copolymer (C) having an ethylene content of from about 20 mol % to about 60 mol % (hereinafter, the copolymer (C) may be abbreviated as an EVOH (C)), a maleic anhydride-modified polyolefin (D), a compatibilizer (E) and dirt (F).

Polyolefin (B)

Examples of suitable polyolefins for use as polyolefin (B) in the monolayer film (A) include, for example, low density polyethylene (LDPE), linear low density polyethylene (LLDPE), medium density polyethylene (MDPE), high density polyethylene (HDPE); an ethylene-based copolymer obtained by copolymerizing ethylene with α-olefins, such as 1-butene, 1-hexene, and 4-methyl-1-pentene, or acrylic ester; polypropylene (PP); a propylene-based copolymer obtained by copolymerizing propylene with α-olefins, such as ethylene, 1-butene, 1-hexene, and 4-methyl-1-pentene; poly(1-butene), poly(4-methyl-1-pentene); an ionomer resin; or the like. Among all, a polyethylene resin is preferred. LLDPE or LDPE is more preferred. One type of the polyolefin (B) may be used singly, or two or more types may also be used in combination.

The polyolefin (B) desirably has a melt flow rate (MFR; a measured value at a temperature of 190° C. and a load of 2160 g in accordance with JIS K 7210) of about 0.1 g/10 minutes or more, or about 0.5 g/10 minutes or more. The polyolefin (B) desirably has an MFR of about 100 g/10 minutes or less, or about 50 g/10 minutes or less, or about 30 g/10 minutes or less.

The content of the polyolefin (B) is preferably from about 70, or from about 75, to about 97, or to about 90, parts by mass based on the total mass of monolayer film (A). Without being bound, it is believe that less than about 70 parts by mass of polyolefin (B) decreases the mechanical strength of monolayer film (A), and more than 97 about parts by mass polyolefin (B) decreases clarity of monolayer film (A) and the number of fisheye defects becomes larger.

EVOH (C)

The EVOH (C) contained in the monolayer film (A) is obtained by saponifying vinyl acetate units in an ethylene-vinyl acetate copolymer. An EVOH having a lower ethylene content is difficult to melt-process because of a higher melting point and lower thermal stability. In contrast, when an EVOH has a very high ethylene content, the gas barrier performance decreases and compatibility with dirt (F) also decreases. In addition, an EVOH having a low degree of saponification of vinyl acetate units shows worse thermal stability than an EVOH having a high degree of saponification of vinyl acetate units.

From such perspective, the EVOH (C) desirably has an ethylene content of from about 20 mol %, or from about 22 mol %, or from about 24 mol %, to about 60 mol %, or to about 55 mol %, or to about 50 mol %. Also, the EVOH (C) desirably has vinyl acetate units with a degree of saponification of about 96% or more, or about 98% or more, or about 99% or more. In particular, an EVOH having an ethylene content of from about 20 to about 60 mol % and having a degree of saponification of about 99% or more, is used particularly preferably in the present invention because of the good clarity and reduced fisheye defects in the final monolayer film.

The ethylene unit content and the degree of saponification of the EVOH (C) can be determined by nuclear magnetic resonance (NMR) analysis by conventional methods as recognized by one of ordinary skill in the relevant art.

The EVOH (C) may optionally have another monomer copolymerized therein as long as not inhibiting the effects of the invention, which is generally in a range of about 5 mol % or less. Such monomer may include, for example one or a combination of: α-olefins, such as propylene, 1-butene, 1-hexene, and 4-methyl-1-pentene; (meth)acrylic ester; unsaturated carboxylic acid, such as maleic acid, fumaric acid, and itaconic acid; alkyl vinyl ether; N-(2-dimethylaminoethyl)methacrylamide or its quaternary compounds, N-vinylimidazole or its quaternary compounds, N-vinylpyrrolidone, N,N-butoxymethyl acrylamide, vinyltrimethoxysilane, vinylmethyldimethoxysilane, vinyldimethylmethoxysilane, and the like.

The EVOH (C) desirably has a melt flow rate (MFR; a measured value at a temperature of 190° C. and a load of 2160 g in accordance with JIS K 7210) of about 0.1 g/10 minutes or more, or about 0.5 g/10 minutes or more. The EVOH (C) also desirably has a MFR of about 100 g/10 minutes or less, or about 50 g/10 minutes or less, about 30 g/10 minutes or less.

From the perspective of clarity of the monolayer film (A), a ratio [MFR (EVOH)/MFR (PO)] when the MFR of the EVOH (C) is MFR (EVOH) and the MFR of polyolefin (B) is MFR (PO), is preferably from about 0.1, or from about 0.3, to about 100, or to about 50.

The content of the EVOH (C) is preferably from about 1.0, or from about 2.0, or from about 3.0, to about 8.0, or to about 6.0, or to about 5.0 parts by mass, based on the total mass of monolayer film (A). Without being bound, it is believed that about 1.0 parts by mass EVOH (C) results in reduced clarity of monolayer film (A) and the number of fisheye defects becomes larger, and more than about 8 parts by mass decreases mechanical strength of the monolayer film (A).

Maleic Anhydride (MAh) Modified Polyolefin (D)

The MAh modified polyolefin (D) contained in the monolayer film (A) is not particularly limited. Typical examples of the MAh modified polyolefin (D) include MAh modified polyethylenes, MAh modified polypropylenes, a MAh-modified ethylene-ethyl acrylate copolymer, and a MAh modified ethylene-vinyl acetate copolymer. In terms of mechanical strength and fisheye defects, MAh modified polyethylenes and MAh modified polypropylenes are preferable, and MAh modified polyethylenes are particularly preferable among these.

The MAh modified polyolefin (D) desirably has an amount of MAh modification of from about 0.01, or from about 0.2, to about 2, or to about 1.5 mmol/g. Without being bound, it is believed that less than 0.01 mmol/g decreases clarity of monolayer film (A), and in the case of more than 2 mmol/g, the number of fisheye defects in monolayer film (A) increases. The amount of acid modification of the present invention means an amount of MAh components calculated by dividing an acid value measured using potassium hydroxide by a molecular weight of potassium hydroxide.

The MAh modified polyolefin (D) desirably has a melt flow rate (MFR; a measured value at a temperature of 190° C. and a load of 2160 g in accordance with JIS K 7210) of about 0.1 g/10 minutes or more, or about 0.5 g/10 minutes or more, and about 100 g/10 minutes or less, or about 50 g/10 minutes or less, or about 30 g/10 minutes or less.

The content of the MAh modified polyolefin (D) is preferably from about 0.5, or from about 1.0, to about 15, or to about 10 parts by mass, based on the total mass of the monolayer film (A). Without being bound, it is believed that a content of the MAh modified polyolefin (D) of less than about 0.5 parts by mass decreases clarity of monolayer film (A) and the number of fisheye defects increases, and in the case that the content of the MAh modified polyolefin (D) is more than about 15 parts by mass, the number of fisheye defects in monolayer film (A) also increases.

Compatibilizer (E)

Compatibilizer (E) is not particularly limited so long as it improves compatibility of PO (B), EVOH (C) and MAh-PO (D), and may include: a combination of resins, inorganic materials and low molecular weight chemical substances. For example, the resins may be polyolefin resin (G), a saponified ethylene-vinyl acetate resin (S-EVA; H), a maleic anhydride-modified ethylene-vinyl acetate resin (MAh modified EVA; K). The inorganic materials may be a hydrotalcite (I) and a metal salt (J). The low molecular weight chemical substance may be lubricant (L).

Compatibilizer (E) contained in the monolayer film (A) preferably comprises: a polyolefin resin (G), a saponified ethylene-vinyl acetate resin (S-EVA; H) having an ethylene contents from about 68 mol % to about 98 mol %, a hydrotalcite (I) and a metal salt (J); or a polyolefin resin (G), a maleic anhydride-modified ethylene-vinyl acetate resin (MAh modified EVA; K) having ethylene contents from about 68 mol % to about 98 mol %, a metal salt (J) and a lubricant (L).

The content of the compatibilizer (E) is preferably about 1.0 parts by mass or more, or about 2.0 parts by mass or more, or about 3.0 parts by mass or more, based on the total mass of monolayer film (A). Without being bound, it is believed that less than about 1.0 parts by mass decreases mechanical strength and clarity of monolayer film (A), and the number of fisheye defects increases. There is no limitation for maximum contents of the compatibilizer (E) in the monolayer film (A) (when taking into account the contents of the other components as described above); however, it is believed that the effect of the compatibilizer (E) may saturate at about 10.0 parts by mass, so the content is preferably about 10.0 parts by mass or less, or about 8.0 parts by mass or less.

Polyolefin (G)

Examples of suitable polyolefins for use as polyolefin (G) in compatibilizer (E) include, for example, low density polyethylene (LDPE), linear low density polyethylene (LLDPE), medium density polyethylene (MDPE), high density polyethylene (HDPE); an ethylene-based copolymer obtained by copolymerizing ethylene with α-olefins, such as 1-butene, 1-hexene, and 4-methyl-1-pentene, or acrylic ester; polypropylene (PP); a propylene-based copolymer obtained by copolymerizing propylene with α-olefins, such as ethylene, 1-butene, 1-hexene, and 4-methyl-1-pentene; poly(1-butene), poly(4-methyl-1-pentene); an ethylene vinyl acetate copolymer (EVA); an ionomer resin; or the like. Among all, a polyethylene resin and an EVA are preferred. LDPE and EVA are more preferred. One type of the polyolefin (G) may be used singly, or two or more types may also be used in combination.

Polyolefin (G) may be the same or different than polyolefin (B).

When polyolefin (G) is an EVA, it preferably has an ethylene content more of about 65 mol % or more, or about 70 mol % or more. Without being bound, it is believed that an ethylene content of less than about 65 mol % decreases clarity of monolayer film (A).

The polyolefin (G) desirably has a melt flow rate (MFR; a measured value at a temperature of 190° C. and a load of 2160 g in accordance with JIS K 7210) of about 0.1 g/10 minutes or more, or about 0.5 g/10 minutes or more, and about 100 g/10 minutes or less, or about 50 g/10 minutes or less, or about 30 g/10 minutes or less.

The content of the polyolefin (G) is preferably from about 60, or from about 65, to about 88, or to about 85 parts by mass based on the total mass of compatibilizer (E). Without being bound, it is believed that less than about 60 parts by mass decreases mechanical properties of monolayer film (A), and in the case of more than about 88 parts by mass, decreases mechanical strength and clarity of monolayer film (A) and the number of fisheye defects increases.

S-EVA (H)

The S-EVA (H) contained in the compatibilizer (E) is a saponified ethylene-vinyl acetate copolymer (H) having an ethylene content of from about 65 mol %, or from about 70 mol %, to about 98 mol %, or to about 96 mol %, or to about 94 mol %, and having a degree of saponification of vinyl acetate units of about 20% or more, or about 30% or more, or about 40% or more. An upper limit of the degree of saponification is not particularly limited and may also be about 99 mol % or more. It is also possible to use one substantially having a degree of saponification of approximately 100%. Without being bound, it is believed that the ethylene content is less than about 68 mol % or more than about 98 mol %, or the vinyl acetate units have a degree of saponification of less than about 20%, the effect of improving the compatibility among the polyolefin (B), the EVOH (C) and the dirt (F) is insufficient.

The S-EVA (H) has an ethylene content higher than the ethylene content of the EVOH (C). From the perspective of improving the compatibility among the polyolefin (B), the EVOH (C) and the dirt (F), a difference between the ethylene content of the S-EVA (H) and the ethylene content of the EVOH (C) is preferably about 10 mol % or more, or preferably about 20 mol % or more.

The S-EVA (H) desirably has an MFR (a measured value at a temperature of 190° C. and a load of 2160 g in accordance with JIS K 7210) of about 0.1 g/10 minutes or more, or about 0.5 g/10 minutes or more, or about 1 g/10 minutes or more. Meanwhile, the S-EVA (H) desirably has an MFR of about 100 g/10 minutes or less, or about 50 g/10 minutes or less, or about 30 g/10 minutes or less.

The content of the S-EVA (H) is preferably from about 10, or from about 15, to about 35, or to about 30 parts by mass based on the total mass of compatibilizer (E). Without being bound, it is believed that less than about 10 parts by mass decreases mechanical strength and clarity of monolayer film (A) and the number of fisheye defects increases, and in the case of more than about 35 parts by mass the mechanical strength of monolayer film (A) decreases.

Hydrotalcite (I)

The hydrotalcite (I) in the compatibilizer (E) preferably includes double salt hydrotalcite represented by the formula $$M_xAl_y(OH)_{2x+3y-2z}(b)_z \cdot aH_2O$$

wherein

M denotes one or more of Mg, Ca, Sr, Ba, Zn, Cd, Pb, and Sn, b denotes $CO_3$ or $HPO_4$, x, y, and z are positive numbers, a is 0 or a positive number, and $$2x+3y-2z>0.$$

In the above hydrotalcite (I), it is preferred that M is Mg, Ca and/or Zn, and more preferred that it is a combination of two or more of them. Among these, examples of particularly preferred ones may be as follows:

$Mg_6Al_2(OH)_{16}CO_3 \cdot 4H_2O$;
$Mg_8Al_2(OH)_{20}CO_3 \cdot 5H_2O$;
$Mg_5Al_2(OH)_{14}CO_3 \cdot 4H_2O$;
$Mg_{10}Al_2(OH)_{22}(CO_3)_2 \cdot 4H_2O$;
$Mg_6Al_2(OH)_{16}HPO_4 \cdot 4H_2O$;
$Ca_6Al_2(OH)_{16}CO_3 \cdot 4H_2O$;
$Zn_6Al_2(OH)_{16}CO_3 \cdot 4H_2O$;
$Mg_3ZnAl_2(OH)_{12}CO_3 \cdot 2.7H_2O$;
$Mg_6Zn_2Al_2(OH)_{20}CO_3 \cdot 1.6H_2O$;
$Mg_5Zn_{1.7}Al_{3.3}(OH)_{20}(CO_3)_{1.65} \cdot 4.5H2O$.

The content of the hydrotalcite (I) is preferably from about 1.0, or from about 2.0, to about 8.0, or to about 6.0 parts by mass based on the total mass of the compatibilizer (E). Without being bound, it is believed that less than about 1.0 parts by mass decreases mechanical strength and clarity of monolayer film (A) and the number of fisheye defects increases, and in the case of more than about 8.0 parts by mass the mechanical strength of monolayer film (A) decreases.

Metal Salt (J)

A suitable metal salt (J) in the compatibilizer (E) may include, for example, a metal salt of higher aliphatic acid having a carbon number of from 10 to 26, such as lauric acid, stearic acid, myristic acid, behenic acid, and montanoic acid, particularly a metal salt of Group I, II, or III in the periodic table, which is, for example, a sodium salt, a potassium salt, a calcium salt, and a magnesium salt. It is also possible to use a zinc salt or a lead salt of the above fatty acid. Among these, a metal salt of Group II in the periodic table, such as a calcium salt and a magnesium salt, is preferred because it exhibits the effect by being added in a small amount.

The content of the metal salt (J) is preferably from about 0.5, or from about 1.0, to about 5.0, or to about 4.0 parts by mass based on the total mass of the compatibilizer (E). Without being bound, it is believed that less than about 0.5 parts by mass decreases mechanical strength and clarity of monolayer film (A) and the number of fisheye defects increases, and in the case of more than about 5.0 parts by mass the mechanical strength of monolayer film (A) decreases.

Maleic Anhydride-Modified Ethylene-Vinyl Acetate Copolymer (MAh Modified EVA; K)

The MAh modified EVA (K) used in the present invention is typically obtained by grafting maleic anhydride to an EVA.

The MAh modified EVA (K) contained in the compatibilizer (E) is a maleic anhydride modified ethylene-vinyl acetate copolymer having an ethylene content of from about 65 mol %, or from about 70 mol %, to about 98 mol %, or to about 96 mol %, or to about 94 mol %. Without being bound, it is believed that the ethylene content is less than about 68 mol % or more than about 98 mol %, the effect of improving the compatibility among the polyolefin (B), the EVOH (C) and the dirt (F) is insufficient.

The MAh modified EVA (K) desirably has an amount of MAh modification of from about 0.01, or from about 0.2, to about 2, or to about 1.5 mmol/g. Without being bound, it is believed that less than 0.01 mmol/g decreases clarity of monolayer film (A), and in the case of more than 2 mmol/g, the number of fisheye defects in monolayer film (A) increases. The amount of acid modification of the present invention means an amount of MAh components calculated by dividing an acid value measured using potassium hydroxide by a molecular weight of potassium hydroxide.

The MAh modified EVA (K) desirably has a melt flow rate (MFR; a measured value at a temperature of 190° C. and a load of 2160 g in accordance with JIS K 7210) of about 0.1 g/10 minutes or more, or about 0.5 g/10 minutes or more, and about 100 g/10 minutes or less, or about 50 g/10 minutes or less, or about 30 g/10 minutes or less.

The content of the MAh modified EVA (K) is preferably from about 10, or from about 12, to about 35, or to about 30 parts by mass based on the total mass of compatibilizer (E). Without being bound, it is believed that less than about 10 parts by mass decreases mechanical strength and clarity of monolayer film (A) and the number of fisheye defects increases, and in the case of more than about 35 parts by mass the mechanical strength of monolayer film (A) decreases.

Lubricant (L)

A suitable lubricant (L) contained in the compatibilizer (E) may include, for example, fatty acid amides, such as stearic acid amide, oleic acid amide, erucic acid amide, behenic acid amide, ethylene bis(stearic acid amide), methylol stearic acid amide, N-oleyl palmit amide and N-stearyl erucamide; aliphatic hydrocarbon-based lubricants, such as liquid paraffin, natural paraffin, synthetic paraffin and polyethylene wax; and partial oxide, fluoride and chloride thereof; aliphatic alcohols, such as stearyl alcohol and lauryl alcohol; aliphatic esters, such as stearyl stearate and stearyl laurate; and the like. Among these, ethylene bis(stearic acid amide) is preferred.

The content of the lubricant (L) is preferably from about 0.5, or from about 1.0, to about 2.5, or to about 2.0 parts by mass based on the total mass of the compatibilizer (E). Without being bound, it is believed that less than about 0.5 parts by mass decreases mechanical strength and clarity of monolayer film (A) and the number of fisheye defects increases, and in the case of more than about 2.5 parts by mass the mechanical strength of monolayer film (A) decreases.

Other Components in Compatibilizer (E)

It is also possible to blend other additives into the compatibilizer (E) as long as not inhibiting the effects of the invention. Examples of such an additive may include an antioxidant, an ultraviolet absorber, a plasticizer, a filler and other polymer compounds. Specific examples of the additives may include the following.

Antioxidant: 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

Ultraviolet Absorber: ethylene-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphate ester, and the like.

Filler: glass fibers, asbestos, ballastnite, calcium silicate, and the like.

In addition, many other polymer compounds can also be blended into the compatibilizer (E) as long as not inhibiting the actions and the effects of the present invention.

Process for Producing Compatibilizer (E)

A method to obtain the compatibilizer (E) is not particularly limited, and may include: a method comprising dry blending of each components; a method comprising melt compounding after dry blending of each components in one time; a method comprising melt compounding a portion of components in advance, followed by blending other components there into and melt compounding.

When melt compounding is used for preparation of the compatibilizer (E), the method is not particularly limited, and examples include a ribbon blender, a high-speed mixer-co-kneader, a mixing roll, an extruder (single screw or twin screw extruder, etc.), an intensive mixer, and the like. Among them, a method using a single screw or twin screw extruder is preferred. A temperature of melt compounding is appropriately selected, depending on the type and the molecular weight of resin to be used, a blending ratio of the composition, the type of extruder, and the like, and it is generally within the range of from about 170° C. to about 350° C.

When melt compounding is conducted using an extruder, it is preferred to use an extruder with a high degree of kneading, to seal a hopper port with nitrogen, and to extrude at a low temperature. This enables homogenization of the dispersed state and prevention of gelation or generation and contamination of foreign materials.

Commercialized Product

In some cases, compatibilizer (E) is commercially available as a mixture. Commercially available examples include products sold under the trade designation GF-20, GF-30, GF-31, GF-35 and GF-50 (from Kuraray Co., Ltd.), and Soaresin™ RG500 (Nippon Synthetic Chemical Industry Co., Ltd).

Dirt (F)

The dirt (F) contained in the monolayer film (A) is not particularly limited. The dirt (F) may be contained in the monolayer film (A) by post-consumer recycling of agriculture film having an EVOH layer. The dirt (F) may have, for example, an alkaline earth metal carbonate or sulfate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof. The dirt (F) may comprise at least 2 species of materials described above, or at least 3 species of materials described above, or at least 4 species of materials described above. Dirt (F) may be contained in the monolayer film by post-consumer recycling of agriculture film so that dirt (F) may comprise soil. The percentage of soil in dirt (F) is 50 weight % or more, or 70 weight % or more, or 90% or more, or 100%. The soil, for example, contains same component as dirt (F) described above.

Dirt (F) is present in the monolayer film (A) of the present invention. The content of the dirt (F) is less than about 8.0, or less than about 6.0, or less than about 4.0, or less than about 3.0 parts by mass based on the total mass of monolayer film (A). Without being bound, it is believed that a content more than about 8.0 parts by mass decreases mechanical strength and clarity of monolayer film (A), and increases the number of fisheye defects. The content of dirt (F) is typically about 0.5 parts by mass or more based on the total mass of monolayer film (A).

The dirt (F) is particulate and typically has an average particle size of more than about 20 μm, or more than about 25 μm. Without being bound, it is believed that effect of combination of EVOH (C) and compatibilizer (E) to improve clarity and reduce the number of fisheye defects is diminished when the average particle size of the dirt is below about 20 μm.

Other Components in Monolayer Film (A)

It is also possible to blend other additives into the monolayer film (A) as long as not inhibiting the effects of the invention. Examples of such an additive may include an antioxidant, an ultraviolet absorber, a plasticizer, a lubricant, a filler, and other polymer compounds. Specific examples of the additives may include the following.

Antioxidant: 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

Ultraviolet Absorber: ethylene-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphate ester, and the like.

Lubricant: ethylene bis-stearic acid amide, butyl stearate, stearic acid, and the like.

Filler: glass fibers, asbestos, ballastnite, calcium silicate, and the like.

In addition, many other polymer compounds can also be blended into the monolayer film (A) as long as not inhibiting the actions and the effects of the present invention.

Process for Producing Monolayer Film (A)

A method of producing the monolayer film (A) of the present invention is not particularly limited. Examples include a method in which a thermoplastic resin is melt extruded on the monolayer film obtained from the resin composition of the present invention.

Examples of the processing machine to produce the monolayer film include, for example, a cast extrusion machine, a blown extrusion machine, a compression molding and the like. The extrusion temperature for processing is appropriately selected depending on the composition of resin to be used, a molecular weight, a blending ratio of the composition, the type of processing machine, and the like, and is generally within the range of from about 170° C. to about 350° C.

A method to blend the components for making the monolayer film (A) is not particularly limited and may include: a method comprising dry blending of the components, and then extrusion of the blends to make the monolayer film; a method comprising melt compounding of the components to make the pellets, and then extrusion of the pellets to make the monolayer film; a method comprising shredding of multilayer film having the polyolefin resin (B), the EVOH resin (C), the MAh modified polyolefin resin (D) and the dirt (F), and compounding with the compatibilizer (E) to make pellets having all components, and then extrusion of the pellets to make the monolayer film.

Means for melt compounding for preparation of the resin composition of the present invention is not particularly limited, and examples include a ribbon blender, a high-speed mixer-co-kneader, a mixing roll, an extruder (single screw or twin screw extruder, etc.), an intensive mixer, and the like. Among them, a method using a single screw or twin screw extruder is preferred. A temperature of melt compounding is appropriately selected, depending on the type and the molecular weight of resin to be used, a blending ratio of the composition, the type of extruder, and the like, and it is generally within the range of from about 170° C. to about 350° C.

When melt compounding is conducted using an extruder, it is preferred to use an extruder with a high degree of kneading, to seal a hopper port with nitrogen, and to extrude at a low temperature. This enables homogenization of the dispersed state and prevention of gelation or generation and contamination of foreign materials.

Process for Recycling Agricultural Film

The present invention is also directed to processes for recycling polymer waste, such as post-consumer waste polymer. The post-consumer waste polymer is "size-reduced" typically shredded, flaked, chipped or granulated prior to the cleaning step. Processes and apparatus for shredding, flaking, chipping or granulating polymer waste are well known in the art, as will be readily apparent to one of ordinary skill in the art.

The cleaning step may comprise washing, with or without float-separation techniques, the polymer waste to remove engrained dirt and other volatile and solid impurities. Typically, the polymer waste is washed in a washing tank in the presence of water and other cleaning additives, such as surfactants, detergents and the like. The polymer waste material may be mechanically agitated to facilitate the removal of impurities. Additionally, the polymer waste may be subjected to abrasion during the washing step, for example, with a brush and the like.

One advantage of the present invention is that the washing step need not be complete or rigorous as some dirt should be retained by the waste material.

EXAMPLES

The present invention is more specifically described by way of examples. The scope of the present invention, however, is not limited to these examples. It is to be noted that production methods as well as methods of measurement, calculation and evaluation in Examples and Comparative Examples are each as described below.

Materials

Polyolefin (B-1): DOWLEX™ 2056, LLDPE commercially available from the Dow Chemical Company (MFR 1.0 g/10 minutes (190° C., 2,160 g))

EVOH (C-1): EVAL™ H171B, Ethylene-Vinyl Alcohol copolymer commercially available from Kuraray Co., Ltd. (ethylene content 38 mol %, degree of saponification 99.9 mol %, MFR 1.6 g/10 minutes (190° C., 2,160 g))

MAh-modified Polyolefin (D-1): ADMER® NF498E, MAh modified polyethylene commercially available from Mitsui Chemicals, Inc. (MFR 2.6 g/10 minutes (190° C., 2,160 g))

Compatibilizer (E-1): GF-30 commercially available from Kuraray Co., Ltd.

Compatibilizer (E-2): GF-50 commercially available from Kuraray Co., Ltd.

Dirt (F-1): MIRACLE-GRO® All Purpose Garden Soil commercially available from the Scotts Company LLC.

Polyolefin (G-1): Petrothene® NA960, LDPE commercially available from LyondellBasell (MFR 1.0 g/10 minutes (190° C., 2,160 g))

Polyolefin (G-2): EVAFLEX® EV460, EVA commercially available from E. I. du Pont de Nemours and Company (MFR 2.5 g/10 minutes (190° C., 2,160 g))

S-EVA (H-1): MELTHENE® H6051, Saponified Ethylene vinyl acetate copolymer commercially available from Tosoh Corporation (MFR 5.5 g/10 minutes (210° C., 2,160 g))

Hydrotalcite (I-1): DHT-4A commercially available from Kyowa Chemical Industry Co., Ltd.

Metal salt (J-1): Calcium stearate (Ca-St)

Metal salt (J-2): Magnesium stearate (Mg-St)

MAh modified EVA (K-1): FUSABOND® C190, MAh-modified ethylene vinyl acetate copolymer commercially available from E. I. du Pont de Nemours and Company (MFR 16 g/10 minutes (190° C., 2,160 g)).

Lubricant (L-1): ALFLOW® H50F-P, Ethylene bis(stearamide) commercially available from NOF corporation.

Example 1

82 parts by mass of polyolefin (B-1), 5.0 parts by mass of EVOH (C-1), 5.0 parts by mass of MAh-modified PE (D-1), 6 parts by mass of compatibilizer (E-1) and 2 parts by mass of dirt (F-1) were blended. The resulting blend was subjected to melt compounding, pelletizing and drying under the following conditions, and then the resin composition was obtained.

Apparatus: 30 mmD twin screw extruder (TEX-30α manufactured by The Japan Steel Works, Ltd.)

L/D: 45 Screw: co-rotating full-intermeshing type

Number of die holes: 4 holes (3 mmD)

Extrusion temperature (° C.): C2=180, C3=200, C4-C13=230, Die=230

Rotation speed: 200 rpm

Output: about 20 kg/hr

Drying: hot air drying at 80° C. for 6 hr

The composition is shown in Table 1.

Preparation of Monolayer Film (A)

The resulting resin composition was formed into a monolayer film (A) under the following conditions. During monolayer film preparation, the number of fisheye defects in the monolayer film was counted.

Apparatus: 30 mmD single screw extruder (OCS cast film line manufactured by Optical Control System GmbH)

L/D: 26.9

Screw: full flight type, Compression ratio 3:1

Die: 300 mm width

Extrusion temperature (° C.): Z1=180 Z2 to Z9=220
Screen mesh: None
Temperature of cooling roll: 40° C.
Screw rotation speed: 30 rpm
Drawing speed: 3.5 m/minute
Film thickness 40 μm
Defect detector: FSA100

Tensile Strength at Break and Elongation at Break

In accordance with ASTM D 882-18, tensile strength at break and elongation at break of the resulting monolayer film were measured. The film was subjected to humidity conditioning at 23° C./50% RH. Then, it was cut into a strip having a width of 25.4 mm and a length of 12 cm, and subjected to measurement with universal testing machine (Instron 4466 manufactured by Instron) in machine direction (MD) and traverse direction (TD) at grip distance of 50 mm and a tensile speed of 500 mm/minute. Then, the strength and elongation at break were obtained, and the results are shown in Table 2.

Puncture Strength

In accordance with ASTM F 1306-16, puncture strength of the resulting monolayer film was measured. The film was subjected to humidity conditioning at 23° C./50% RH. Then, it was cut into a square piece with 80 mm by 80 mm, and subjected to measurement with universal testing machine (Instron 4466 manufactured by Instron) equipped with a probe having fixture with a diameter of 3.18 mm and a spherical radius of 1.6 mm at a rate of 25 mm/minute. Then, the maximum strength until the needle passed through the film was obtained, and the result is shown in Table 2.

Haze

In accordance with ASTM D1003-13, haze value of the resulting monolayer film was measured. The film was cut into a square piece with 150 mm by 150 mm, and subjected to measurement with Haze meter (Haze Gard Plus manufactured by BYK Gardner). Then, the haze value was obtained, and the result is shown in Table 2.

Fisheye Defects Number

Fisheye defects number was counted during manufacturing process of the film and evaluated by below criteria. Defect size counted was greater than 100 μm. The result is shown in Table 2.
  A: Fisheye defects number below 100 (1/m2)
  B: Fisheye defects number between 100-1000 (1/m2)
  C: Fisheye defects number over 1000 (1/m2)

Example 2

Example 1 was repeated, except that 80 parts by mass of polyolefin (B-1) and 4.0 parts by mass of dirt (F-1) were used.

The composition is shown in Table 1, and the test results are shown in Table 2.

Example 3

Example 1 was repeated, except that 78 parts by mass of polyolefin (B-1) and 6.0 parts by mass of dirt (F-1) were used.

The composition is shown in Table 1, and the test results are shown in Table 2.

Example 4

Example 1 was repeated, except that 86 parts by mass of polyolefin (B-1) and 2.0 parts by mass of Compatibilizer (E-1) were used.

The composition is shown in Table 1, and the test results are shown in Table 2.

Example 5

Example 1 was repeated, except that 78 parts by mass of polyolefin (B-1) and 10.0 parts by mass of Compatibilizer (E-1) were used.

The composition is shown in Table 1, and the test results are shown in Table 2.

Example 6

Example 1 was repeated, except that Compatibilizer (E-2) was used in place of Compatibilizer (E-1).

The composition is shown in Table 1, and the test results are shown in Table 2.

Comparative Example 1

98 parts by mass of polyolefin (B-1) and 2.0 parts by mass of dirt (F-1) were blended. The resulting blend was subjected to melt compounding, pelletizing and drying under the same condition as Example 1, and then the resin composition was obtained. The composition is shown in Table 1.

The monolayer film was prepared and evaluated in the same manner as Example 1. The test results are shown in Table 2.

Comparative Example 2

Example 1 was repeated, except that 87 parts by mass of polyolefin (B-1) was used, and EVOH (C-1) was not used.

The composition is shown in Table 1, and the test results are shown in Table 2.

Comparative Example 3

Example 1 was repeated, except that 88 parts by mass of polyolefin (B-1) was used and compatibilizer (E-1) was not used.

The composition is shown in Table 1, and the test results are shown in Table 2.

Comparative Example 4

Example 1 was repeated, except that 76 parts by mass of polyolefin (B-1) and 8 parts by mass of dirt (F-1) were used.

The composition is shown in Table 1, and the test results are shown in Table 2.

TABLE 1

| Composition | | E1 | E2 | E3 | E4 | E5 | E6 | CE1 | CE2 | CE3 | CE4 |
|---|---|---|---|---|---|---|---|---|---|---|---|
| Polyolefin (B) | B-1 | 82 | 80 | 78 | 86 | 78 | 82 | 98 | 87 | 88 | 76 |
| EVOH (C) | C-1 | 5 | 5 | 5 | 5 | 5 | 5 | 0 | 0 | 5 | 5 |
| MAh modified Polyolefin (D) | D-1 | 5 | 5 | 5 | 5 | 5 | 5 | 0 | 5 | 5 | 5 |

TABLE 1-continued

| Composition | | E1 | E2 | E3 | E4 | E5 | E6 | CE1 | CE2 | CE3 | CE4 |
|---|---|---|---|---|---|---|---|---|---|---|---|
| Compatibilizer (E) | E-1 | 6 | 6 | 6 | 2 | 10 | 0 | 0 | 6 | 0 | 6 |
| | E-2 | 0 | 0 | 0 | 0 | 0 | 6 | 0 | 0 | 0 | 0 |
| Dirt (F) | F-1 | 2 | 4 | 6 | 2 | 2 | 2 | 2 | 2 | 2 | 8 |

TABLE 2

| Properties | | E1 | E2 | E3 | E4 | E5 | E6 | CE1 | CE2 | CE3 | CE4 |
|---|---|---|---|---|---|---|---|---|---|---|---|
| Tensile strength at Break (MPa) | MD | 7.7 | 8.2 | 10.3 | 8.2 | 7.6 | 7.9 | 8.2 | 8.1 | 8.4 | 8.2 |
| | TD | 9.2 | 9.4 | 10.2 | 7.2 | 9.1 | 8.8 | 8.0 | 7.9 | 6.1 | 7.9 |
| Elongation at Break (%) | MD | 502 | 456 | 410 | 453 | 498 | 486 | 499 | 486 | 398 | 353 |
| | TD | 479 | 430 | 385 | 402 | 468 | 478 | 500 | 495 | 328 | 321 |
| Puncture strength (N) | | 3.2 | 2.5 | 2.2 | 2.6 | 3.1 | 3.4 | 4.2 | 4.0 | 2.0 | 1.8 |
| Haze (—) | | 10.3 | 12.4 | 15.2 | 14.5 | 11.1 | 10.5 | 23.4 | 21.3 | 21.2 | 20.2 |
| Fisheye | | A | A | B | B | A | A | C | C | C | C |

As shown in Table 2, Examples 1 to 6 showed good mechanical properties, haze value and a low number of fisheye defects.

On the other hand, Comparative Example 1, which did not have EVOH (C-1), MAh-modified PE (D-1) and compatibilizer (E-1), showed high haze value and a high number of fisheye defects.

In addition, Comparative Example 2, which did not have EVOH (C-1) showed high haze value and a high number of fisheye defects.

Furthermore, Comparative Example 3, which did not have compatibilizer (E-1), showed high haze value and a high number of fisheye defects.

These results taught that combination of EVOH (C-1) and MAh modified PE (D-1) and compatibilizer (E-1) was necessary to get a clear film having dirt in it.

Regarding Comparative Examples 4, which had higher dirt contents, showed high haze value and a high number of fisheye defects. These results taught that dirt contents should be less than 8 parts by mass to get a good quality film.

The invention claimed is:

1. A monolayer film (A) of a composition comprising a melt blend of:
   a size-reduced post-consumer waste polymer;
   a compatibilizer (E); and
   a dirt particulate (F) having an average particle size of 20 µm or more;
   wherein
   the size-reduced post-consumer waste polymer comprises:
   a resin (B) selected from the group consisting of polyethylene, a copolymer of ethylene and an α-olefin, a copolymer of ethylene and an acrylic ester, polypropylene, a copolymer of propylene and an α-olefin, and an ionomer;
   an ethylene vinyl alcohol copolymer resin (C) having an ethylene content of from about 20 mol % to about 60 mol % and a degree of saponification of 99% or more, and
   a maleic anhydride-modified polyolefin resin (D) comprising from about 0.01 to about 2 mmol/g of maleic anhydride;
   the compatibilizer (E), comprises: a resin (G) selected from an ethylene vinyl acetate copolymer and a polyethylene resin different from the resin (B),
   a saponified ethylene-vinyl acetate resin (H) having an ethylene content from about 68 mol % to about 98 mol % and a degree of saponification of 40 mol % to about 99 mol%,
   a hydrotalcite (I), and a salt (J) of a Group II metal and an aliphatic acid having a carbon number from 10 to 26,
   wherein
   the mass ratio of the dirt (F) is from 0.5 to less than about 8 parts by weight based on the total weight of the monolayer film (A).

2. The monolayer film of claim 1, wherein the content of the polyolefin resin (B) is from about 70 to about 97 parts by mass based on the total mass of monolayer film (A), the content of the ethylene vinyl alcohol copolymer (C) is from about 1.0 to about 8.0 parts by mass based on the total mass of monolayer film (A), the content of maleic anhydride-modified polyolefin resin (D) is from about 0.5 to about 15 parts by mass based on the total mass of monolayer film (A), and the content of compatibilizer (E) is from about 1.0 to about 10.0 parts by mass based on the total mass of monolayer film (A).

3. The monolayer film (A) of claim 2, wherein the content of the polyfin resin (G) is from about 60 to about 88 parts by mass based on the total mass of the compatibilizer (E), the content of the saponified ethylene-vinyl acetate resin (H) is from about 10 to about 35 parts by mass based on the total mass of the compatibilizer (E), the content of the hydrotalcite (I) is from about 1.0 to about 8.0 parts by mass based on the total mass of the compatibilizer (E), and the content of the salt (J) is from about 0.5 to about 5 parts by mass based on the total mass of the compatibilizer (E).

4. The monolayer film (A) of claim 1, wherein the ethylene vinyl alcohol copolymer (C) resin has a melt flow rate of from about 0.1 to about 100 g/10 minutes, the polyolefin resin (B) has a melt flow rate of from about 0.1 to about 100 g/10 minutes, and a ratio of the melt flow rate of the ethylene vinyl alcohol copolymer (C) to the melt flow rate of the polyolefin resin (B) is from about 0.1 to about 100.

5. The monolayer film (A) of claim 1, wherein the post-consumer waste polymer is obtained from recycled agricultural film or a fumigation film.

6. A process of preparing the monolayer film (A) of claim 1, comprising:

(1) size-reducing the post-consumer waste polymer to generate a size-reduced post-consumer waste polymer contaminated with dirt (F),
(2) cleaning the size-reduced post-consumer waste polymer to reduce the dirt (F) content,
(3) mixing the cleaned, size-reduced waste polymer with e compatihilizer (E) to generate a mixture, and
(4) melt extruding the mixture to generate the monolayer film (A).

\* \* \* \* \*